(12) United States Patent
Abbott

(10) Patent No.: US 12,741,531 B2
(45) Date of Patent: Sep. 22, 2026

(54) PTO SUPPORT BRACKET

(71) Applicant: MUNCIE POWER PRODUCTS, INC., Muncie, IN (US)

(72) Inventor: James R. Abbott, Farmland, IN (US)

(73) Assignee: Muncie Power Products, Inc., Muncie, IN (US)

( * ) Notice: Subject to any disclaimer, the term of this patent is extended or adjusted under 35 U.S.C. 154(b) by 0 days.

(21) Appl. No.: 19/055,663

(22) Filed: Feb. 18, 2025

(65) Prior Publication Data

US 2025/0276573 A1 Sep. 4, 2025

Related U.S. Application Data

(60) Provisional application No. 63/559,753, filed on Feb. 29, 2024.

(51) Int. Cl.
*B60K 17/28* (2006.01)

(52) U.S. Cl.
CPC .................................... *B60K 17/28* (2013.01)

(58) Field of Classification Search
CPC ...................................................... B60K 17/28
See application file for complete search history.

(56) References Cited

U.S. PATENT DOCUMENTS 6,099,191 A * 8/2000 Werner .................. A01B 71/08 403/315
2017/0008397 A1* 1/2017 Kajino .................. B60K 17/28
2017/0307129 A1* 10/2017 Rinkenbaugh ........... F16M 1/04

* cited by examiner

*Primary Examiner* — Jason D Shanske
*Assistant Examiner* — Matthew James O'Neill
(74) *Attorney, Agent, or Firm* — Dentons Bingham Greeenbaum LLP; Brian W. Chellgren; Daniel L. Boots

(57) ABSTRACT

This disclosure relates to power takeoff devices (PTOs) useful for mounting on transmissions and for performing, directly or indirectly, useful work via the PTO's rotatable output shaft. More particularly, this disclosure relates to a PTO support bracket configured to support the PTO when a heavy auxiliary device is directly mounted thereto.

16 Claims, 13 Drawing Sheets

PTO SUPPORT BRACKET

This application claims the benefit of U.S. provisional patent application Ser. No. 63/559,753 filed Feb. 29, 2024, for PTO SUPPORT BRACKET, which is incorporated herein by reference.

FIELD OF THE INVENTION

This disclosure relates to power takeoff devices (PTOs) useful for mounting on transmissions and for performing, directly or indirectly, useful work via the PTO's rotatable output shaft. More particularly, this disclosure relates to a PTO support bracket configured to support the PTO when a heavy auxiliary device is directly mounted thereto.

BACKGROUND OF THE INVENTION

The use of a PTO in association with vehicle (e.g., truck) or stationary engine transmissions is generally known. Such PTOs often include an input gear for connection to an input shaft or transmission, an output gear for connection to an output shaft and, optionally, a clutch mechanism for selectively engaging and disengaging power to the output shaft so as to selectively rotate the output shaft of the PTO to perform useful work, such as to power an auxiliary device. Once connected to a gear within the transmission, the input gear of the PTO is connected to and can draw mechanical power from the transmission.

An auxiliary device, such as, for example, a hydraulic pump, may be directly mounted on an output flange of a transmission-mounted PTO. However, directly mounting a heavy auxiliary device on a PTO places stress on the mechanical connection between the PTO and the transmission. Excessive stress can and does cause damage to the PTO, transmission and auxiliary device. For this reason, manufacturers of PTOs typically publish weight limits for direct mounted auxiliary devices. In situations where a heavy auxiliary device exceeding the published weight limit must be used, users typically create support brackets based on the PTO, transmission and auxiliary device being used. This method has limitations, as it typically involves custom fitting the bracket to the auxiliary device after the PTO and auxiliary device are installed, or shimming a pre-made bracket to correctly fit so as to not induce stress on the PTO, transmission or auxiliary device. The quality of both the custom support bracket and installation of said custom support bracket can vary greatly depending on the skill and experience of the user. Poorly designed, constructed or installed custom auxiliary device support brackets can and do cause damage to the PTO, transmission and auxiliary device. In severe cases, the PTO and transmission can be damaged to the extent that both must be replaced. Correctly designed, manufactured, and installed auxiliary device support brackets are time-intensive to make and implement. Unfortunately, it is not uncommon for users to weld together several pieces of scrap metal to construct makeshift custom support brackets and attach them to the auxiliary device and to whatever part of the vehicle may be convenient. Welded corners of custom auxiliary device brackets tend to flex as a vehicle bounces, resulting in movement of the auxiliary device supported by the bracket.

The inventor of the present disclosure realized that improvements in support systems for PTOs and direct-mounted auxiliary devices are needed. Certain preferred features of the present disclosure address these and other needs and provide other important advantages.

SUMMARY

Embodiments of the present disclosure include a PTO support bracket configured to use with a transmission-mounted PTO with an auxiliary device, such as a pump, directly mounted to the output flange of the PTO. The disclosed PTO support bracket is configured for attachment to the transmission and to the PTO adjacent the output flange, as opposed to typical custom support brackets, which are configured for attachment to the transmission or other part of the vehicle and to the auxiliary device itself. The location of the PTO support bracket on the PTO shortens the bending moment acting on the PTO by the attached auxiliary device and substantially increases the weight limit for direct mounted auxiliary devices for that PTO. Another advantage of the disclosed PTO support bracket over a traditional custom support bracket attached to an auxiliary device is that the disclosed bracket does not in any way limit the orientation of the auxiliary device flange, which mates with the output flange of the PTO, or the orientation of the auxiliary device itself. In other words, the disclosed PTO support bracket does not limit the clocking of the PTO output flange, and the flange can be adjusted with the PTO support bracket already installed on the PTO, neither of which is possible with a traditional custom support bracket.

Some embodiments of the present invention include a PTO support bracket for a power takeoff, comprising a main portion including a generally planar transmission attachment portion, a generally planar and semi-circular PTO attachment portion arranged substantially parallel to the transmission attachment portion, and a connecting portion extending between the transmission attachment portion and the PTO attachment portion and; a semi-circular clamping portion configured to removably attach to the PTO attachment portion of the main portion; wherein the clamping portion and PTO attachment portion are configured to cooperatively radially surround a PTO housing; and wherein the transmission attachment portion of the main portion is configured to removably attach to a transmission. In further embodiments, the semi-circular PTO attachment portion terminates in a lower end and an upper end, each including a threaded aperture, and wherein the semi-circular clamping portion terminates in a lower end and an upper end, each including a threaded bore corresponding to each of the threaded apertures. In certain embodiments, the clamping portion is removably attached to the PTO attachment via a plurality of fasteners. In some embodiments, a first fastener is positioned through the threaded bore in the lower end of the clamping portion and into the corresponding threaded aperture in the lower end of the PTO attachment portion, and wherein a second fastener is positioned through the threaded bore in the upper end of the clamping portion and into the corresponding threaded aperture in the upper end of the PTO attachment portion. In further embodiments, when the PTO attachment portion is attached to the clamping portion, the lower end of the PTO attachment portion is spaced apart from the lower end of the clamping portion and the upper end of the PTO attachment portion is spaced apart from the upper end of the clamping portion. In certain embodiments, the transmission attachment portion includes a plurality of sides, including a first side and a second side. In some embodiments, the connecting portion is generally L-shaped and further includes a transverse portion extending substantially horizontally and substantially perpendicular to the first side of the transmission attachment portion, and an ascending portion extending substantially vertically and substantially perpendicular to the transverse portion and substantially parallel to the transmission attachment portion. In further embodiments, the invention further comprises a first gusset extending between the connecting portion and the first side of the transmission attachment portion. In certain embodiments, the invention further comprises a second gusset extending between the transmission attachment portion and the PTO attachment portion. In some embodiments, the invention further comprises one or more bolt holes extending from the first side of the transmission attachment portion to the second side of the transmission attachment portion. In further embodiments, the transmission attachment portion is generally triangular in shape with the one or more bolt holes positioned at one or more vertices of the transmission attachment portion. In certain embodiments, the connecting portion is a straight angle between the transmission attachment portion and the PTO attachment portion.

Other embodiments of the present invention include a PTO support bracket for a power takeoff, comprising a main portion including a generally planar transmission attachment portion, and a generally planar and semi-circular PTO attachment portion arranged substantially parallel to the transmission attachment portion and; wherein the transmission attachment portion of the main portion is configured to removably attach to a transmission. In some embodiments, the semi-circular PTO attachment portion forms a receiving surface to receive and support a portion of a PTO housing. In further embodiments, the transmission attachment portion includes a plurality of sides, including a first side and a second side. In certain embodiments, the transmission attachment portion is generally L-shaped and further includes a transverse portion extending substantially horizontally and substantially perpendicular to the first side of the transmission attachment portion, and an ascending portion extending substantially vertically and substantially perpendicular to the transverse portion and substantially parallel to the transmission attachment portion. In some embodiments, the invention further comprises a first gusset extending between the connection portion of the first side of the transmission attachment portion and a second gusset extending between the transmission attachment portion and the PTO attachment portion. In further embodiments, the invention further comprises one or more bolt holes extending from the first side of the transmission attachment portion to the second side of the transmission attachment portion. In certain embodiments, the transmission attachment portion is generally triangular in shape with the one or more bolt holes positioned at one or more vertices of the transmission attachment portion.

Further embodiments of the present invention include a method of attaching the PTO support bracket as disclosed herein to a PTO device connected to a transmission, the PTO device including a PTO housing and an output flange, the method comprising the steps of attaching the clamping portion to the PTO attachment portion such that the clamping portion and PTO attachment portion radially surround the PTO housing adjacent to the output flange; positioning a first fastener through the threaded bore in the lower end of the clamping portion and into the corresponding threaded aperture in the lower end of the PTO attachment portion; positioning a second fastener through the threaded bore in the upper end of the clamping portion and into the corresponding threaded aperture in the upper end of the PTO attachment portion; positioning the transmission attachment portion such that the second side of the transmission attachment portion contacts the transmission; attaching the transmission attachment portion to the transmission by inserting a fastener through each bolt hole in the transmission attachment portion into a corresponding bolt hole in the transmission; tightening the first fastener and the second fastener securing the clamping portion to the PTO attachment portion; and tightening the fasteners securing the transmission attachment portion to the transmission.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein does not necessarily address every object described herein, and each embodiment does not necessarily include each feature described. Other forms, embodiments, objects, advantages, benefits, features, and aspects of the present disclosure will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

Some of the figures shown herein may include dimensions or may have been created from scaled drawings. However, such dimensions, or the relative scaling within a figure, are by way of example only, and are not to be construed as limiting the scope of this invention.

DETAILED DESCRIPTION OF THE ILLUSTRATED EMBODIMENTS

Figure 1A:
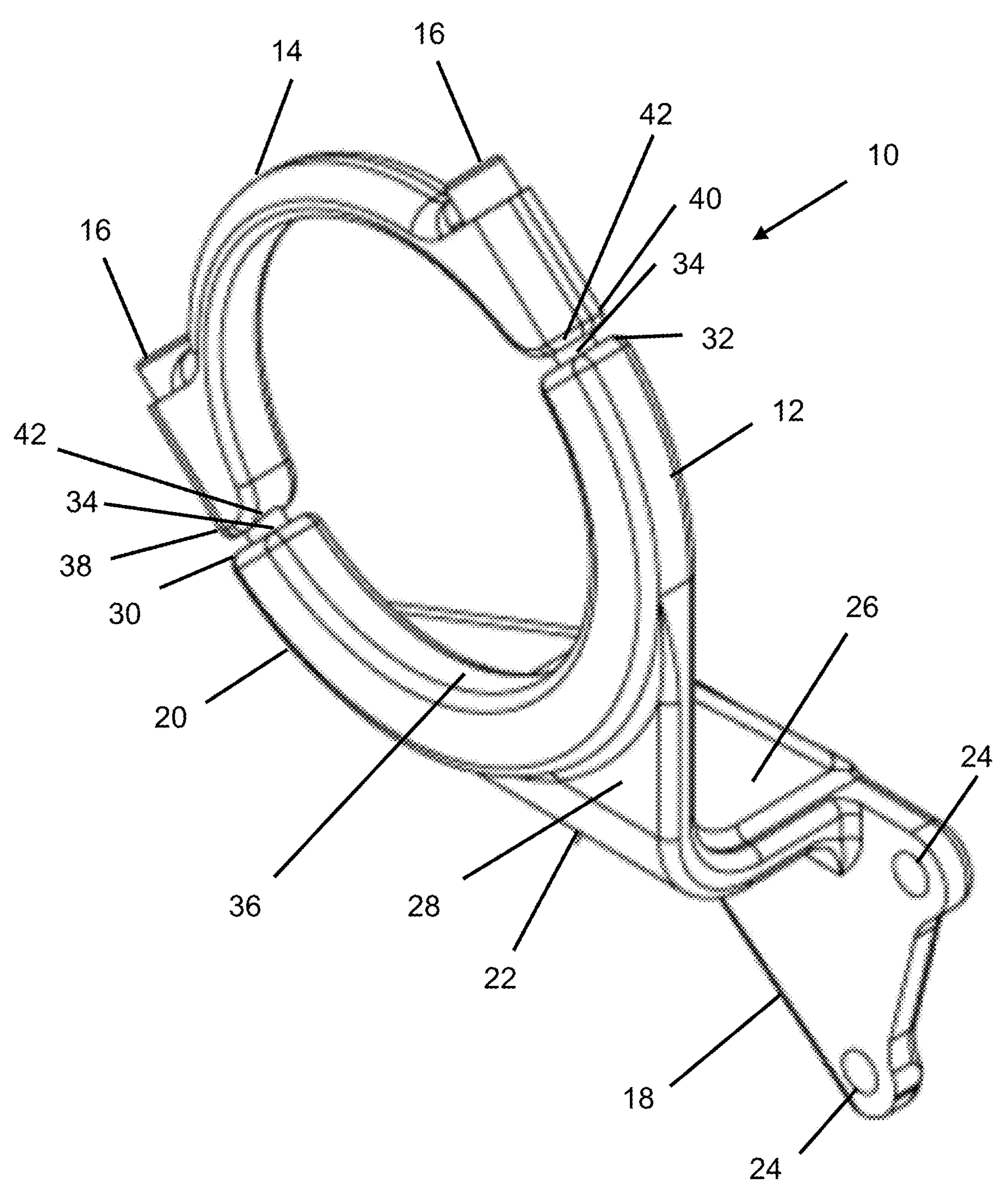
FIG. 1A is a front/first side perspective view of an embodiment of a PTO support bracket.

For the purposes of promoting an understanding of the principles of the invention disclosed herein, reference will now be made to one or more embodiments, which may or may not be illustrated in the drawings, and specific language will be used to describe the same. It will nevertheless be understood that no limitation of the scope of the disclosure is thereby intended; any alterations and further modifications of the described or illustrated embodiments, and any further applications of the principles of the disclosure as illustrated herein are contemplated as would normally occur to one skilled in the art to which the disclosure relates. At least one embodiment of the disclosure is shown in great detail, although it will be apparent to those skilled in the relevant art that some features or some combinations of features may not be shown for the sake of clarity.

Any reference to "invention" within this document is a reference to an embodiment of a family of inventions, with no single embodiment including features that are necessarily included in all embodiments, unless otherwise stated. Furthermore, although there may be references to benefits or advantages provided by some embodiments, other embodiments may not include those same benefits or advantages, or may include different benefits or advantages. Any benefits or advantages described herein are not to be construed as limiting to any of the claims.

Specific quantities (spatial dimensions, temperatures, pressures, times, force, resistance, current, voltage, concentrations, wavelengths, frequencies, heat transfer coefficients, dimensionless parameters, etc.) may be used explicitly or implicitly herein, such specific quantities are presented as examples only and are approximate values unless otherwise indicated. Discussions pertaining to specific compositions of matter, if present, are presented as examples only and do not limit the applicability of other compositions of matter, especially other compositions of matter with similar properties, unless otherwise indicated. When used with a numerical value, the terms "about," "approximately," or "substantially" mean, unless otherwise specified, a range of numerical values within ten percent of the most precise significant digit in the stated value. For example "about 10" means the range from 9 to 11, while "about 10.0" means the range from 9.9 to 10.1. Similarly, the terms when used with a textual description of a numerical parameter, such as "substantially perpendicular" means an angle within ten percent of 90 degrees to a given surface (e.g., 81 degrees to 99 degrees). The term "heavy" as used in this document in connection with an auxiliary device for attachment to a PTO refers to an auxiliary device with a weight exceeding the published weight limit for direct mounted auxiliary devices for that PTO.

Reference systems that may be used herein can refer generally to various directions, which are merely offered to assist the reader in understanding the various embodiments of the disclosure and are not to be interpreted as limiting. Other reference systems may be used to describe various embodiments. In the nomenclature of this document, the "front" of the PTO support bracket is the side adjacent the output flange of the PTO, the "first side" is the side closest to the transmission, when the PTO support bracket is mounted on a PTO attached to a transmission, the "second side" is the side opposite the transmission and opposite the first side, and the "rear" is the side opposite the front. In comparison to FIG. 1B, the front of the PTO support bracket faces the viewer, the first side is the right side, the second side is the left side, the rear is opposite the viewer, the top is towards the top of the page, and the bottom is towards the bottom of the page. It should be understood that a PTO support bracket may be attached to a PTO in various orientations and a PTO may be attached to a transmission in various orientations, such that the front of the PTO support bracket may or may not be oriented toward the front of the vehicle to which the transmission pertains.

Referring now to FIGS. 1A-1E, a PTO support bracket 10 includes a main portion 12, a clamping portion 14, and a plurality of fasteners 16 for removably attaching the clamping portion 14 to the main portion 12. The main portion 12 includes a generally planar transmission attachment portion 18, a generally planar and semi-circular PTO attachment portion 20 arranged substantially parallel to the transmission attachment portion 18, and a connecting portion 22 extending between the transmission attachment portion 18 and the PTO attachment portion 20. The rear of the transmission attachment portion 18 is configured to abut a transmission. A plurality of bolt holes 24 extend through the transmission attachment portion 18, extending from the front of the transmission attachment portion 18 to the rear of the transmission attachment portion 18, such that the transmission attachment portion 18 may be fastened to a transmission by inserting bolts or other fasteners as known in the art through each bolt hole 24 into a corresponding hole in the transmission. In the depicted embodiment, the transmission attachment portion 18 is generally triangular in shape with two bolt holes 24 positioned at two of the vertices of the triangle. In other embodiments, the transmission attachment portion may not be triangular and may have a different shape as appropriate for abutting different transmission models.

The connecting portion 22 is generally L-shaped, including a transverse portion 26 extending horizontally and substantially perpendicular to the second side of the transmission attachment portion 18. The transverse portion 26 curves upwards into an ascending portion 28 extending vertically and substantially perpendicular to the transverse portion 26 and substantially parallel to the generally planar transmission attachment portion 18. While the connecting portion 22 is shown as generally L-shaped, in other embodiments it may be more curved or may be a straight angle between the transmission attachment portion 18 and the PTO attachment portion 20.

The PTO attachment portion 20 extends from the ascending portion 28 of the connecting portion 22. The PTO attachment portion 20 is semi-circular, extending along approximately 180 degrees of arc, oriented at approximately a 45 degree angle between the upward and second side directions. The semi-circular PTO attachment portion 20 terminates in a lower end 30 and an upper end 32, each including a threaded aperture 34. The semi-circular PTO attachment portion forms a receiving surface 36 to receive and support a portion of a PTO housing.

The clamping portion 14 of the PTO support bracket 10 is semi-circular, extending along approximately 180 degrees of arc. The semi-circular clamping portion 14 terminates in a lower end 38 and an upper end 40, each including a threaded bore 42.

Figure 1B:
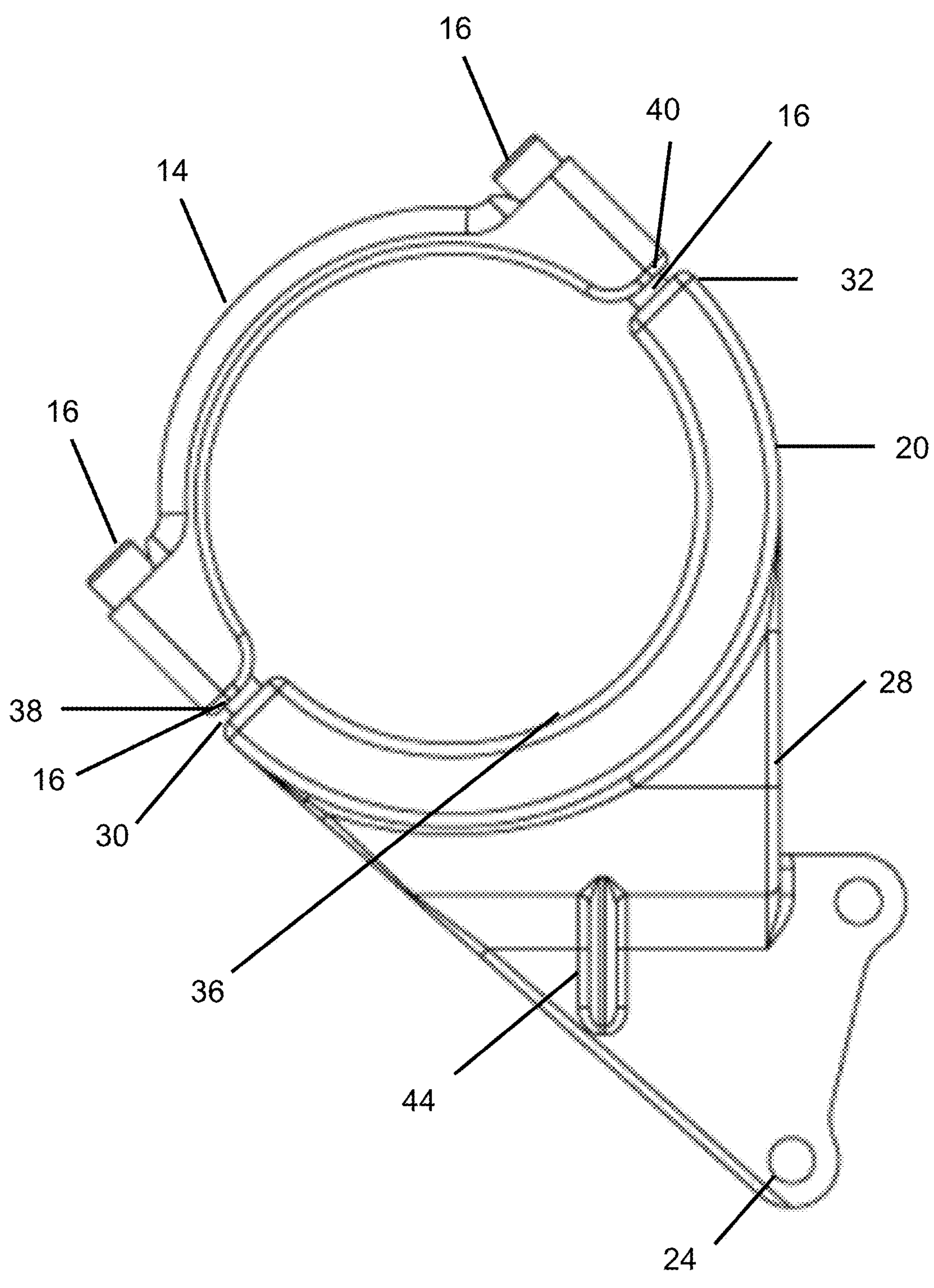
FIG. 1B is a front view of the PTO support bracket of FIG. 1A.
Figure 1C:
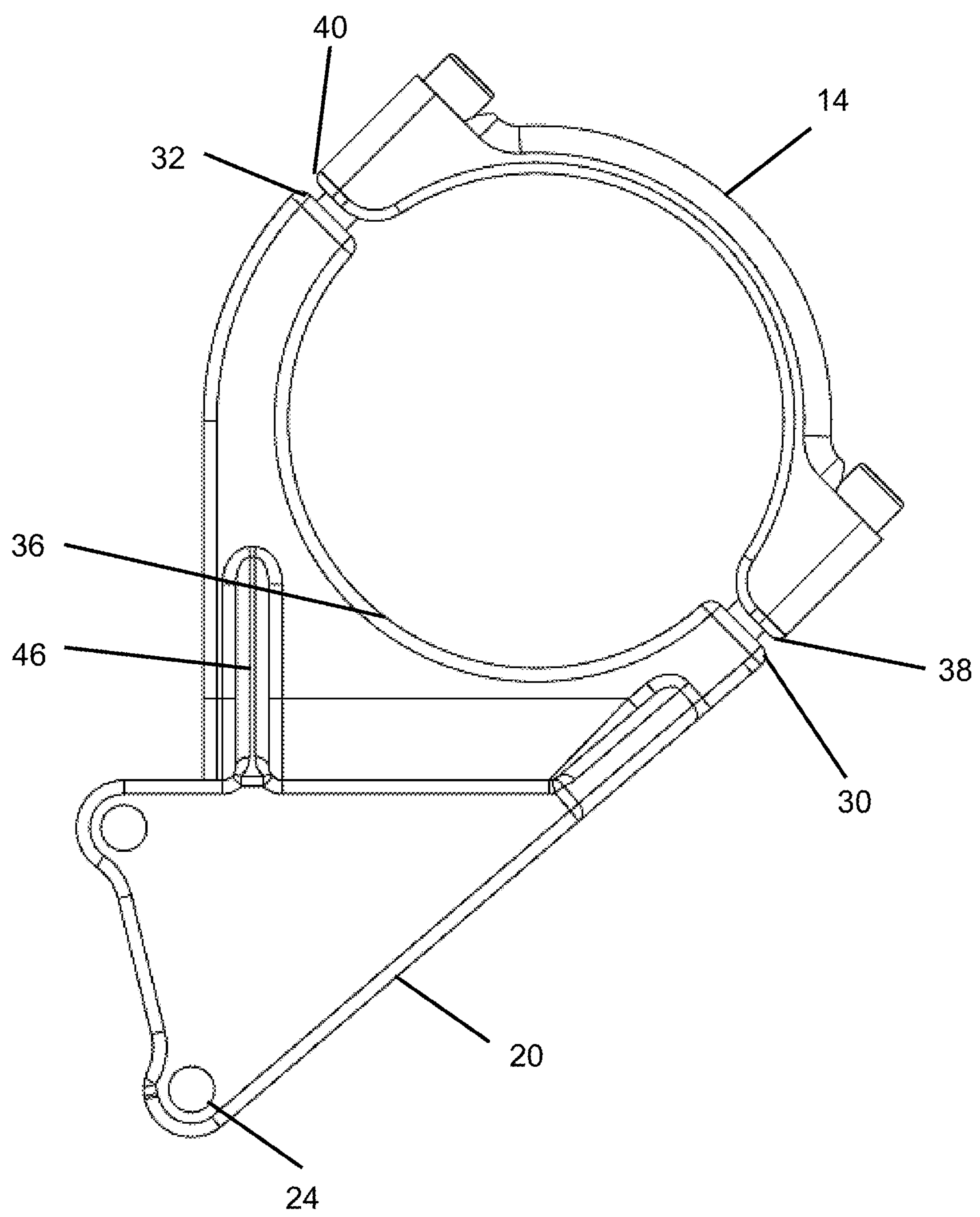
FIG. 1C is a rear view of the PTO support bracket of FIG. 1A.
Figure 1D:
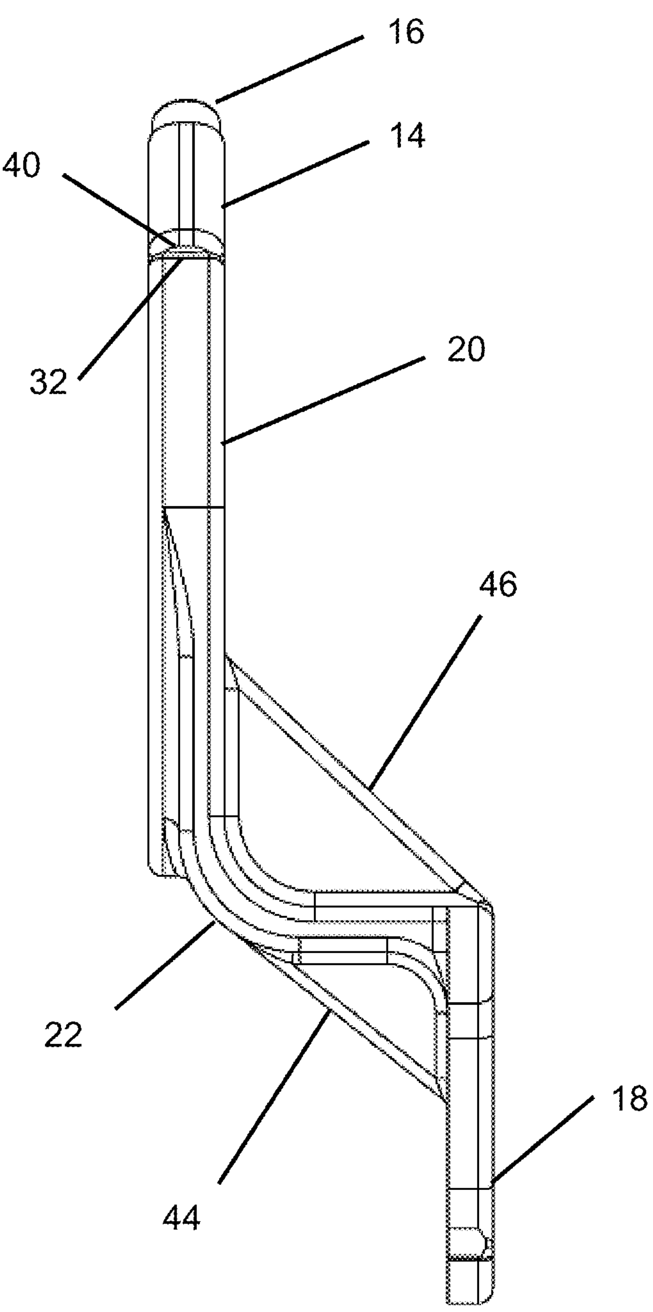
FIG. 1D is a first side view of the PTO support bracket of FIG. 1A.
Figure 1E:
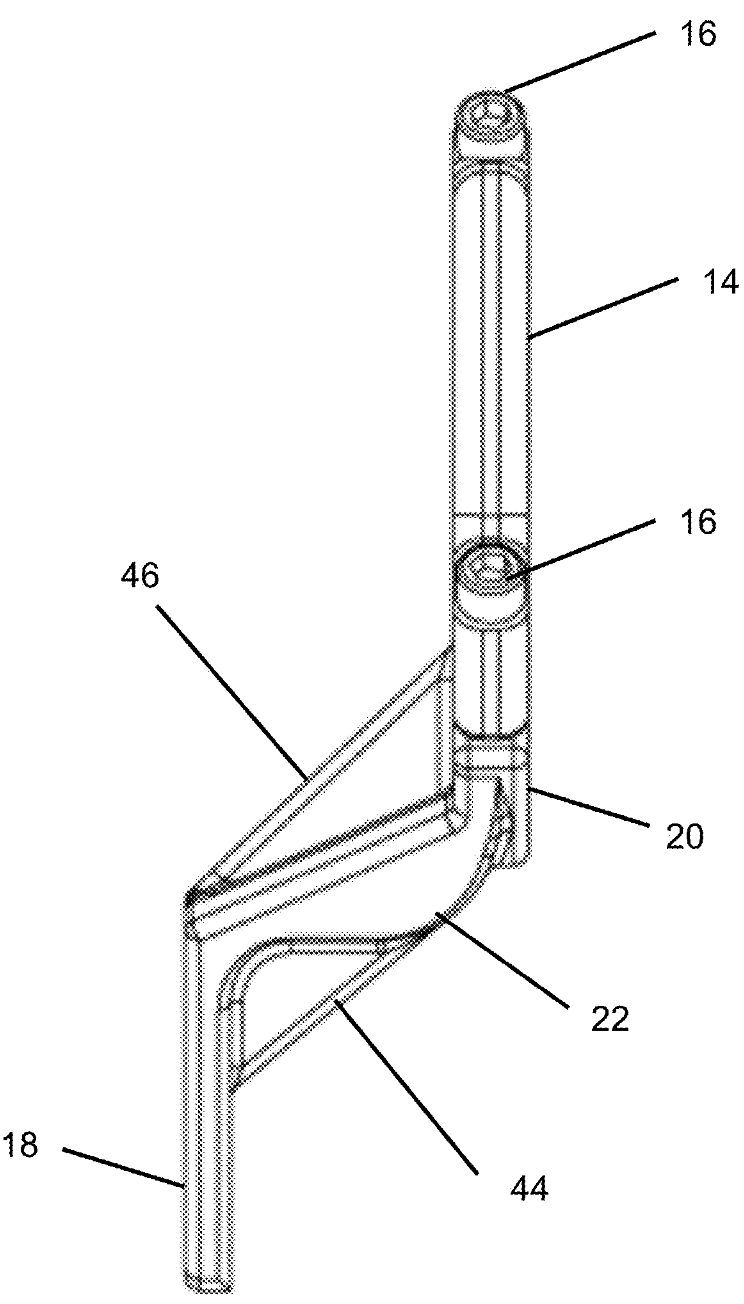
FIG. 1E is a second side view of the PTO support bracket of FIG. 1A.

In some embodiments, as most easily seen in FIGS. 1D and 1E, a first gusset 44 extends between the second side of the transmission attachment portion 18 and the connecting portion 22 and a second gusset 46 extends between the top of the transmission attachment portion 18 and the first side of the PTO attachment portion 20. The gussets 44, 46 prevent the connecting portion 22 from flexing, thereby maintaining the relative positions of the transmission attachment portion 18 and the PTO attachment portion 20.

Figure 2:
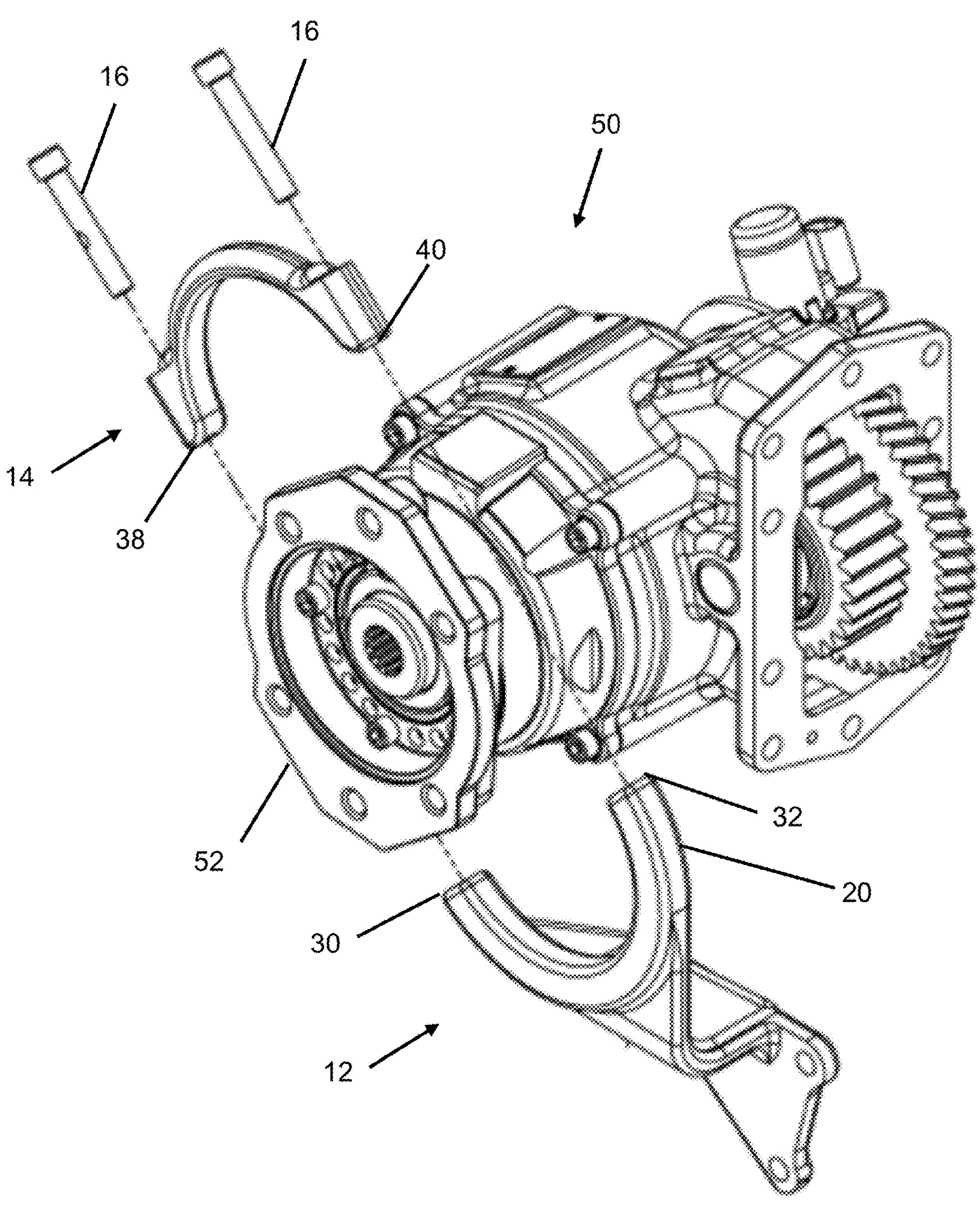
FIG. 2 is an exploded front/first side perspective view of the PTO support bracket in proximity to an exemplary PTO.
Figure 3A:
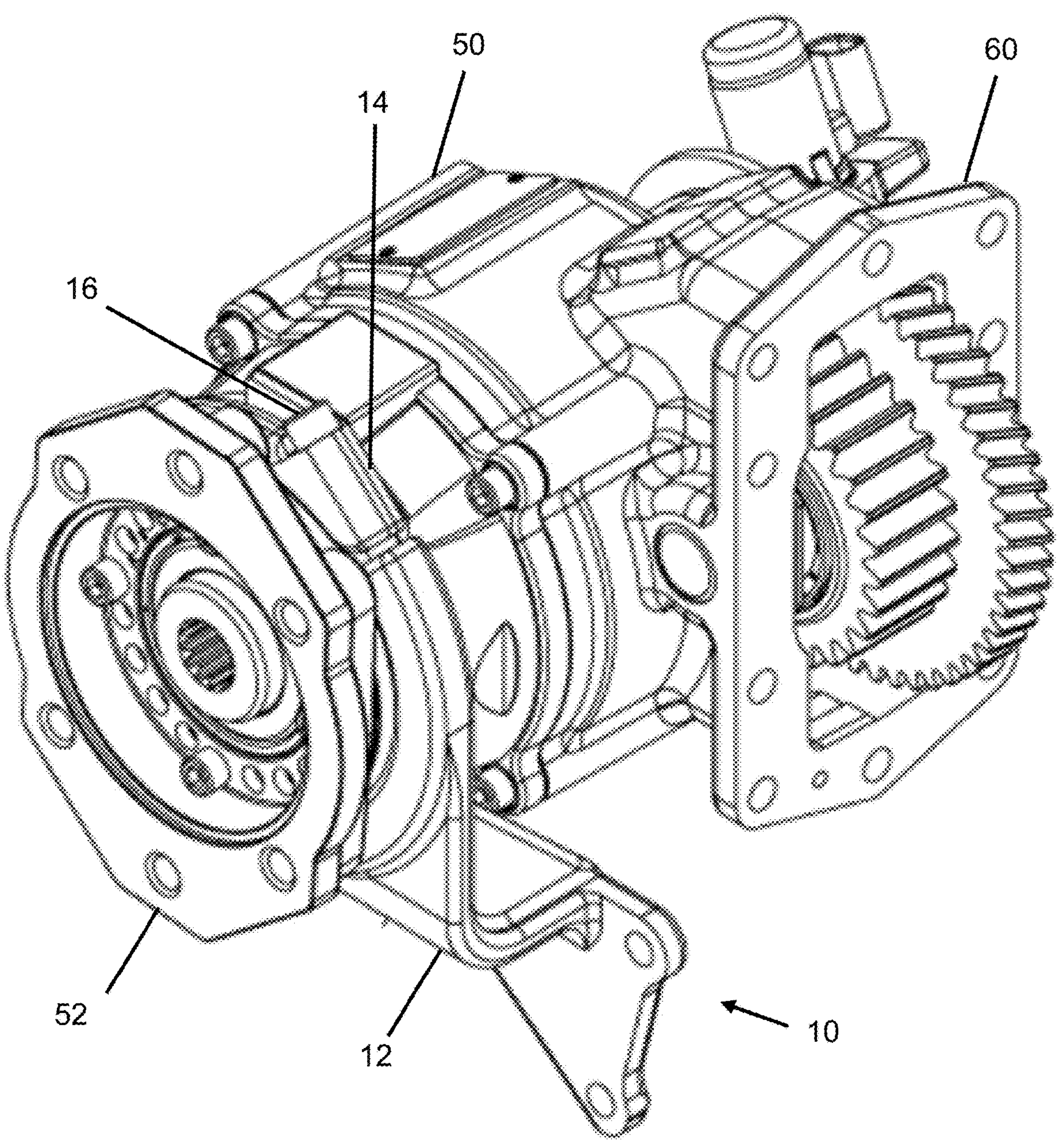
FIG. 3A is a front/first side perspective view of an exemplary PTO with the PTO support bracket attached thereto.
Figure 3B:
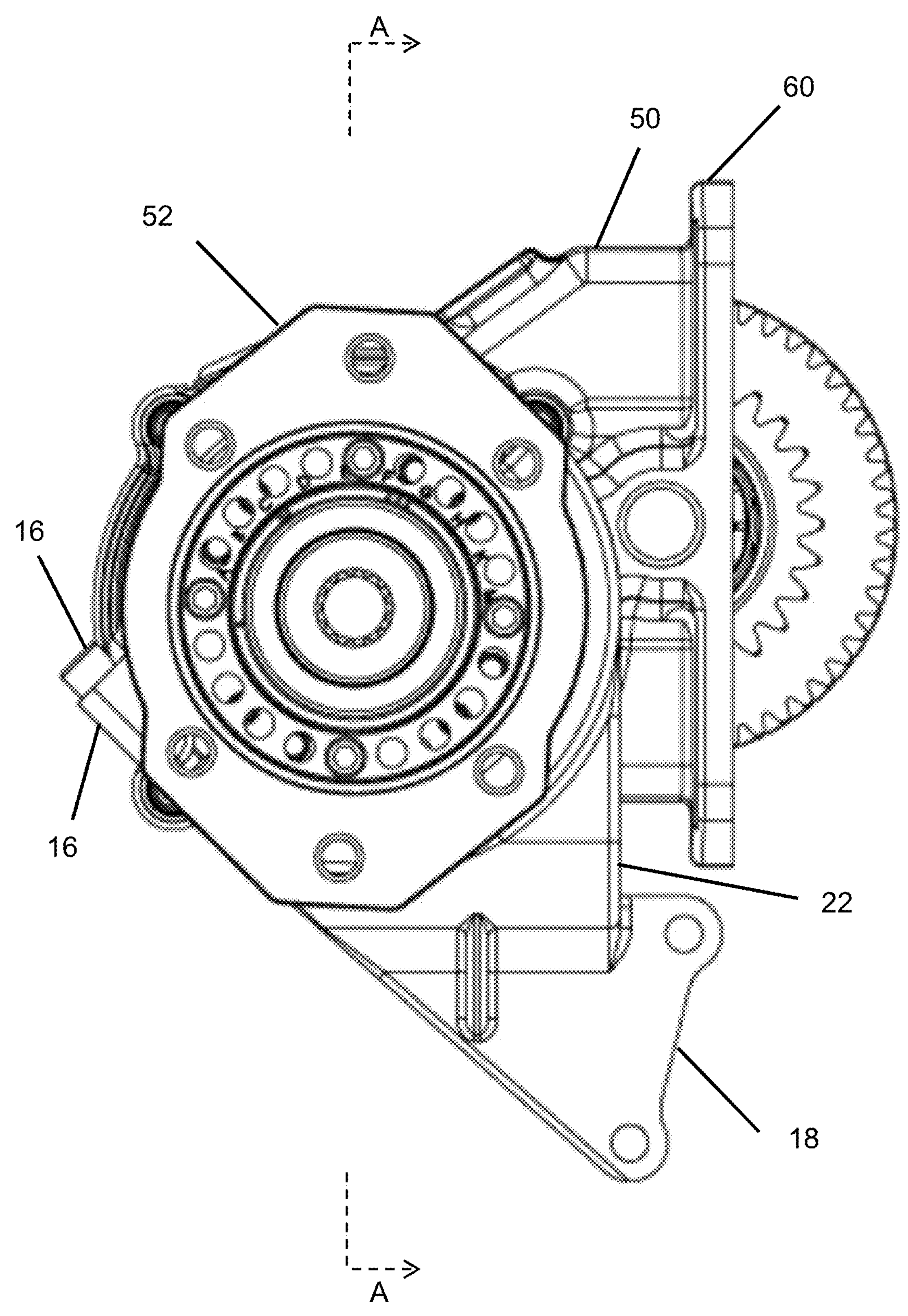
FIG. 3B is a front view of the exemplary PTO of FIG. 3A.
Figure 3C:
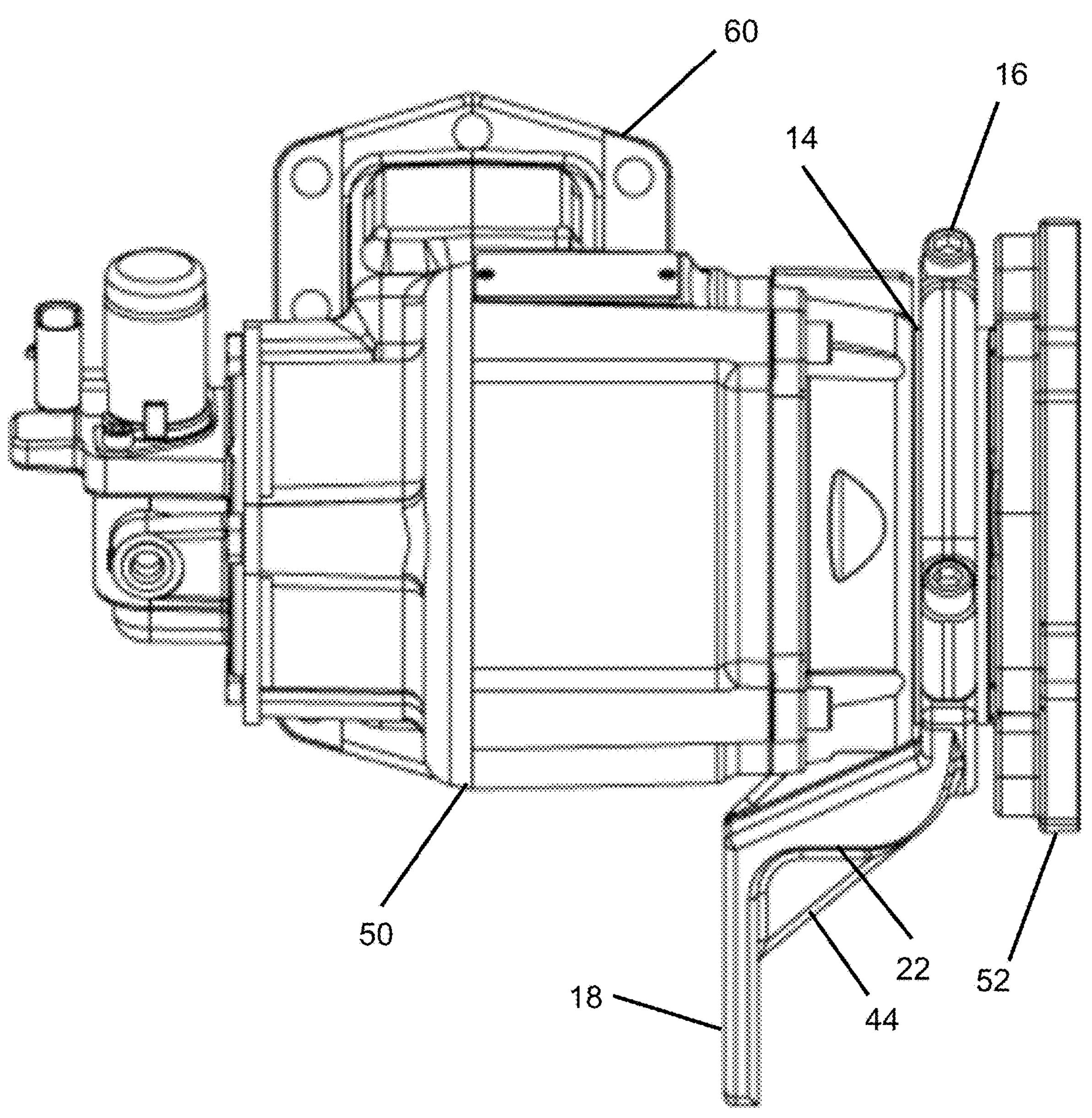
FIG. 3C is a second side view of the exemplary PTO of FIG. 3A.
Figure 3D:
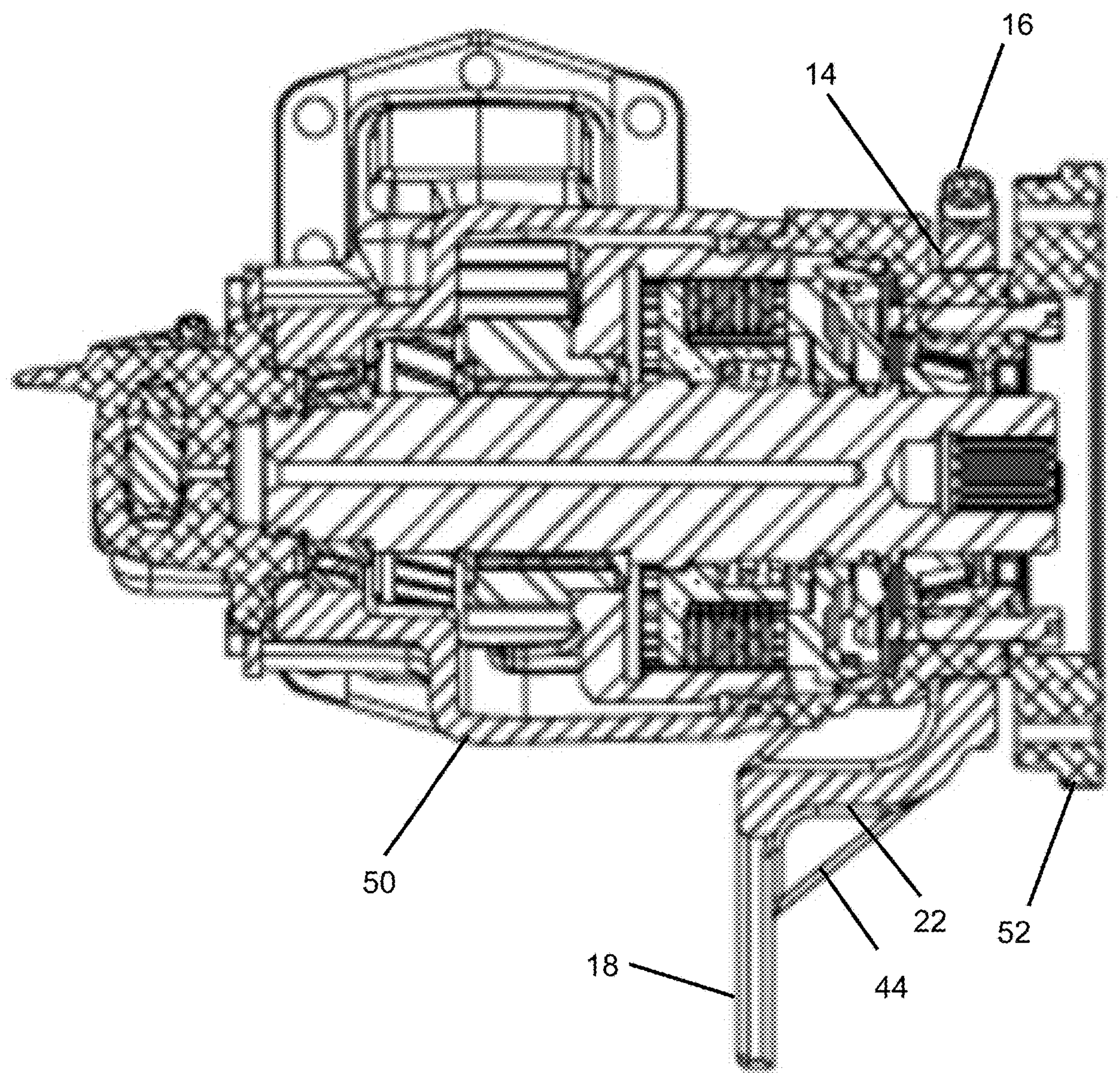
FIG. 3D is a cross-sectional second side view of the exemplary PTO of FIG. 3A along lines A-A of FIG. 3B.

As most easily seen in FIGS. 1A and 2, the PTO attachment portion 20 is configured to, cooperatively with the clamping portion 14, radially surround a PTO housing 50 adjacent the output flange 52. A fastener 16, such as, for example, a cap screw, is inserted through the threaded bore 42 in the lower end 38 of the clamping portion 14 and into the corresponding threaded aperture 34 in the lower end 30 of the PTO attachment portion 20. Similarly, a fastener 16, such as, for example, a cap screw, is inserted through the threaded bore 42 in the upper end 40 of the clamping portion 14 and into the corresponding threaded aperture 34 in the upper end 32 of the PTO attachment portion 20. In the depicted embodiment, as most easily seen in FIGS. 1B and 1C, when the PTO support bracket 10 is assembled, the lower end 38 of the clamping portion 14 is aligned with the lower end 30 of the PTO attachment portion 20, and the upper end 40 of the clamping portion 14 is aligned with the upper end 32 of the PTO attachment portion 20. The respective lower ends 30, 38 and upper ends 32, 40 are mechanically connected to each other via the respective fasteners 16, but the respective lower ends 30, 38 and upper ends 32, 40 do not directly contact each other and are slightly spaced apart by the fasteners 16.

Figure 4:
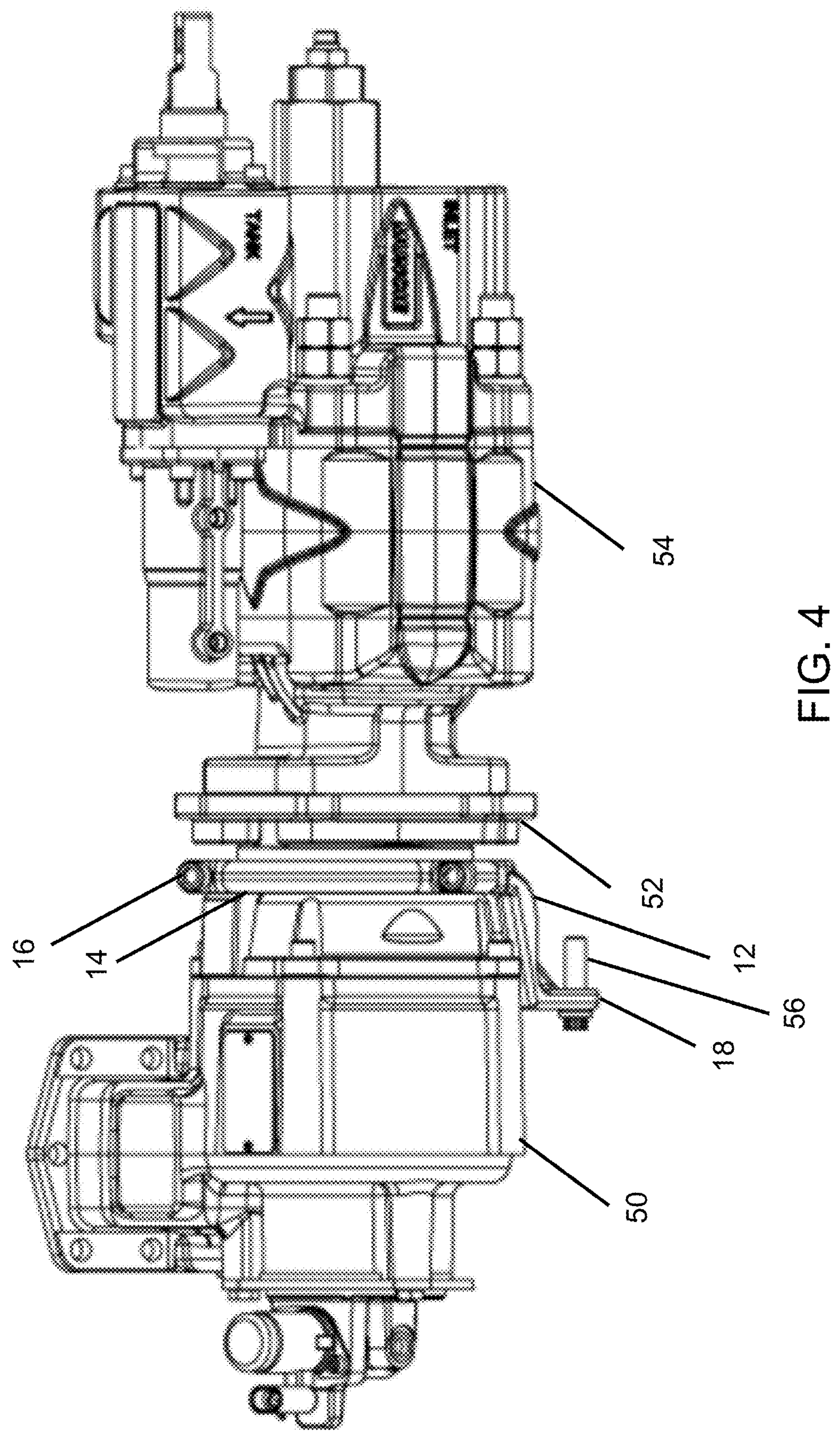
FIG. 4 is a second side view of the exemplary PTO with the PTO support bracket attached thereto, with an exemplary pump directly mounted on the exemplary PTO.
Figure 5A:
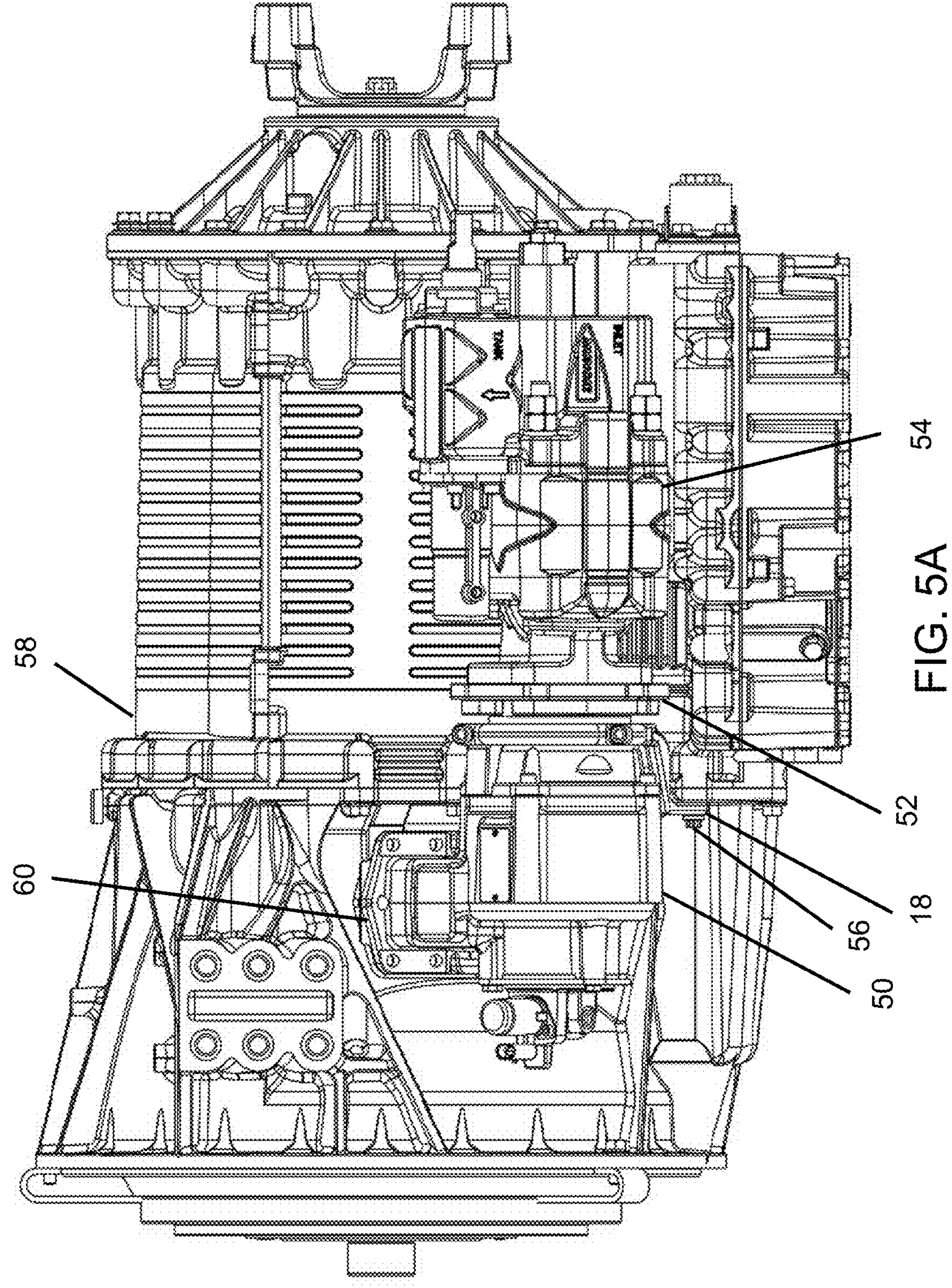
FIG. 5A is a second side view of a transmission, with the exemplary PTO mounted on the transmission, the PTO support bracket attached to the exemplary PTO and to the transmission, and the exemplary pump directly mounted on the exemplary PTO.
Figure 5B:
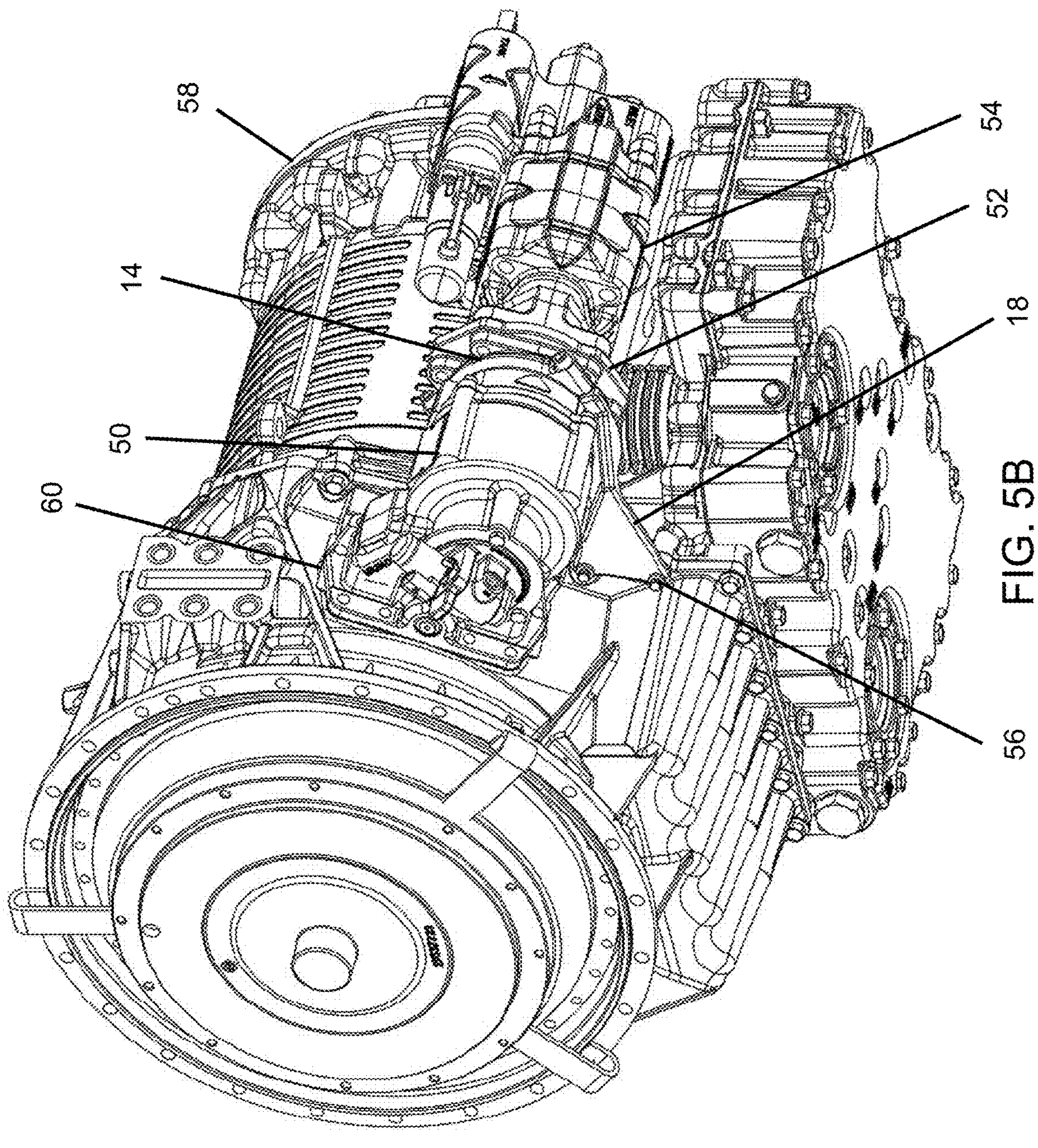
FIG. 5B is a rear/second side perspective view of the transmission of FIG. 5A.

While the PTO attachment portion 20 and clamping portion 14 are shown as oriented at approximately a 45 degree angle between the upward and second side directions, other orientations may be used in other embodiments. In the depicted orientation, as most easily seen in FIGS. 1B and 1C, the lower end 30 of the PTO attachment portion 20 extends upwards above the horizontal and inhibits a PTO from moving laterally out of the receiving surface 36 when the clamping portion 14 is not attached. In other embodiments (not shown), the clamping portion and PTO attachment portion may be oriented such that the clamping portion is upward from the PTO attachment portion or to the second side of the PTO attachment portion. In these orientations, the clamping portion may be attached or removed while the PTO is attached to a transmission. In further embodiments, the clamping portion may be oriented to the first side of the PTO attachment portion. In such embodiments, the PTO support bracket would necessarily be attached to the PTO before the PTO is mounted on the transmission to avoid clearance issues. FIGS. 3A-3D depict an exemplary PTO housing 50 with the PTO support bracket 10 attached thereto, adjacent the output flange 52. FIG. 4 depicts the PTO housing 50 with the PTO support bracket 10 attached thereto, with an exemplary auxiliary device 54, namely, a pump, directly mounted on the output flange 52 of the PTO housing 50. FIG. 4 also includes a bolt 56 extending through one of the plurality of bolt holes 24 in the transmission attachment portion 18. Such bolt 56 would be used to attach the PTO support bracket 10 to a transmission by insertion into a corresponding hole in the transmission. FIGS. 5A and 5B depict the PTO housing 50 with mounted auxiliary device 54 and PTO support bracket 10 as mounted on an exemplary transmission 56.

In typical arrangements, the input flange 60 of the PTO housing 50 is attached to a transmission 58 via bolts extending through bores in the input flange 60 and into corresponding apertures in the transmission 58. This mechanical connection between the input flange 60 of the PTO housing 50 and the transmission 58 provides the only support for the PTO housing 50, and can be strained when the PTO housing 50 additionally supports a heavy auxiliary device 54 mounted thereto. In the present disclosure, the disclosed PTO support bracket 10 radially surrounds the PTO housing 50 adjacent the output flange 52 and attaches to the transmission 58, providing a separate and complementary support for the PTO housing 50. By attaching the PTO support bracket 10 to the PTO housing 50 rather than providing a separate support attached directly to the auxiliary device 54, use of the PTO support bracket 10 is not dependent upon the clocking of the PTO housing 50 and auxiliary device 54 or the location (or absence) of attachment features on the auxiliary device.

In use, the PTO housing 50 is first attached to the transmission 58. Next, the clamping portion 14 and PTO attachment portion 20 of the PTO support bracket 10 are attached to each other about the PTO housing 50 adjacent the output flange 52 as described above and shown in FIG. 2. Next, the rear of the transmission attachment portion 18 of the main portion 12 is positioned to contact the transmission 58 then attached to the transmission 58 by inserting bolts 56 through each bolt hole 24 into a corresponding hole in the transmission 58. Next, the fasteners 16 securing the clamping portion 14 to the PTO attachment portion 20 are tightened and torqued. Last, the bolts 56 securing the transmission attachment portion 18 to the transmission 58 are tightened and torqued. In other embodiments, the main portion 12 of the PTO support bracket 10 may be attached to the transmission 58 prior to the PTO housing 50 being attached to the transmission 58, then the clamping portion 14 attached to the main portion 12 after the PTO is attached to the transmission 58.

Alternate embodiments of the present disclosure PTO support bracket include a main portion but lacking a clamping portion. These embodiments may be useful, for example, in supporting a PTO with a direct mounted heavy auxiliary device in cases where the PTO is attached to a stationary transmission, when there is little or no upward movement of the PTO during use.

While examples, one or more representative embodiments and specific forms of the disclosure have been illustrated and described in detail in the drawings and foregoing description, the same is to be considered as illustrative and not restrictive or limiting. The description of particular features in one embodiment does not imply that those particular features are necessarily limited to that one embodiment. Some or all of the features of one embodiment can be used in combination with some or all of the features of other embodiments as would be understood by one of ordinary skill in the art, whether or not explicitly described as such. One or more exemplary embodiments have been shown and described, and all changes and modifications that come within the spirit of the disclosure are desired to be protected.

What is claimed is:

1. A PTO support bracket for a power takeoff, comprising:

a main portion including a generally planar transmission attachment portion including a first side and a second side opposite the first side, a generally planar and semi-circular PTO attachment portion arranged substantially parallel to the transmission attachment portion, and a connecting portion extending between the transmission attachment portion and the PTO attachment portion; and a semi-circular clamping portion configured to removably attach to the PTO attachment portion of the main portion;

wherein the clamping portion and PTO attachment portion are configured to cooperatively radially surround a PTO housing;

wherein the transmission attachment portion of the main portion is configured to removably attach to a transmission; and wherein the connecting portion is generally L-shaped and further includes a transverse portion extending substantially horizontally and substantially perpendicular to the first side of the transmission attachment portion, and an ascending portion extending substantially vertically and substantially perpendicular to the transverse portion and substantially parallel to the transmission attachment portion.

2. The PTO support bracket of claim 1, wherein the semi-circular PTO attachment portion terminates in a lower end and an upper end, each including a threaded aperture, and wherein the semi-circular clamping portion terminates in a lower end and an upper end, each including a threaded bore corresponding to each of the threaded apertures.

3. The PTO support bracket of claim 2, wherein the clamping portion is removably attached to the PTO attachment portion via a plurality of fasteners.

4. The PTO support bracket of claim 3, wherein a first fastener is positioned through the threaded bore in the lower end of the clamping portion and into the corresponding threaded aperture in the lower end of the PTO attachment portion, and wherein a second fastener is positioned through the threaded bore in the upper end of the clamping portion and into the corresponding threaded aperture in the upper end of the PTO attachment portion.

5. The PTO support bracket of claim 4, wherein, when the PTO attachment portion is attached to the clamping portion, the lower end of the PTO attachment portion is spaced apart from the lower end of the clamping portion and the upper end of the PTO attachment portion is spaced apart from the upper end of the clamping portion.

6. The PTO support bracket of claim 1, further comprising a first gusset extending between the connecting portion and a front of the transmission attachment portion.

7. The PTO support bracket of claim 6, further comprising a second gusset extending between the transmission attachment portion and the PTO attachment portion.

8. The PTO support bracket of claim 4, further comprising one or more bolt holes extending from a front of the transmission attachment portion to a rear of the transmission attachment portion.

9. The PTO support bracket of claim 8, wherein the transmission attachment portion is generally triangular in shape with the one or more bolt holes positioned at one or more vertices of the transmission attachment portion.

10. A PTO support bracket for a power takeoff, comprising:

a main portion including a generally planar transmission attachment portion including a first side and a second side opposite the first side, a generally planar and semi-circular PTO attachment portion arranged substantially parallel to the transmission attachment portion, wherein the PTO attachment portion forms a receiving surface to receive and support a portion of a PTO housing, and a connecting portion extending between the transmission attachment portion and the PTO attachment portion;

wherein the transmission attachment portion of the main portion is configured to removably attach to a transmission; and wherein the connecting portion is generally L-shaped and further includes a transverse portion extending substantially horizontally and substantially perpendicular to the second side of the transmission attachment portion, and an ascending portion extending substantially vertically and substantially perpendicular to the transverse portion and substantially parallel to the transmission attachment portion.

11. The PTO support bracket of claim 10, further comprising a first gusset extending between the connecting portion and the second side of the transmission attachment portion and a second gusset extending between the transmission attachment portion and the PTO attachment portion.

12. The PTO support bracket of claim 10, further comprising one or more bolt holes extending from the first side of the transmission attachment portion to the second side of the transmission attachment portion.

13. The PTO support bracket of claim 12, wherein the transmission attachment portion is generally triangular in shape with the one or more bolt holes positioned at one or more vertices of the transmission attachment portion.

14. A method of attaching the PTO support bracket of claim 8 to a PTO device connected to a transmission, the PTO device including the PTO housing and an output flange, the method comprising the steps of:

attaching the clamping portion to the PTO attachment portion such that the clamping portion and PTO attachment portion radially surround the PTO housing adjacent to the output flange;

positioning a first fastener through the threaded bore in the lower end of the clamping portion and into the corresponding threaded aperture in the lower end of the PTO attachment portion;

positioning a second fastener through the threaded bore in the upper end of the clamping portion and into the corresponding threaded aperture in the upper end of the PTO attachment portion;

positioning the transmission attachment portion such that the rear of the transmission attachment portion contacts the transmission;

attaching the transmission attachment portion to the transmission by inserting a fastener through each bolt hole in the transmission attachment portion into a corresponding bolt hole in the transmission;

tightening the first fastener and the second fastener securing the clamping portion to the PTO attachment portion; and tightening the fasteners securing the transmission attachment portion to the transmission.

15. A PTO support bracket for a power takeoff, comprising:

a main portion including a generally planar transmission attachment portion, a generally planar and semi-circular PTO attachment portion arranged substantially parallel to the transmission attachment portion, and a connecting portion extending between the transmission attachment portion and the PTO attachment portion; and a semi-circular clamping portion configured to removably attach to the PTO attachment portion of the main portion via a first fastener and a second fastener;

wherein the clamping portion and PTO attachment portion are configured to cooperatively radially surround a PTO housing;

wherein the PTO attachment portion terminates in a lower end and an upper end, each including a threaded aperture, and wherein the clamping portion terminates in a lower end and an upper end, each including a threaded bore corresponding to each of the threaded apertures;

wherein, when the clamping portion is attached to the PTO attachment portion, the first fastener is positioned through the threaded bore in the lower end of the clamping portion and into the corresponding threaded aperture in the lower end of the PTO attachment portion, the second fastener is positioned through the threaded bore in the upper end of the clamping portion and into the corresponding threaded aperture in the upper end of the PTO attachment portion, and the lower end of the PTO attachment portion is spaced apart from the lower end of the clamping portion and the upper end of the PTO attachment portion is spaced apart from the upper end of the clamping portion; and wherein the transmission attachment portion of the main portion is configured to removably attach to a transmission.

16. The PTO support bracket of claim 15, wherein the connecting portion is a straight angle between the transmission attachment portion and the PTO attachment portion.

* * * * *